SOLUBILITY OF MgO IN 10-34-0 AMMONIUM POLYPHOSPHATE SOLUTIONS AT 25°C

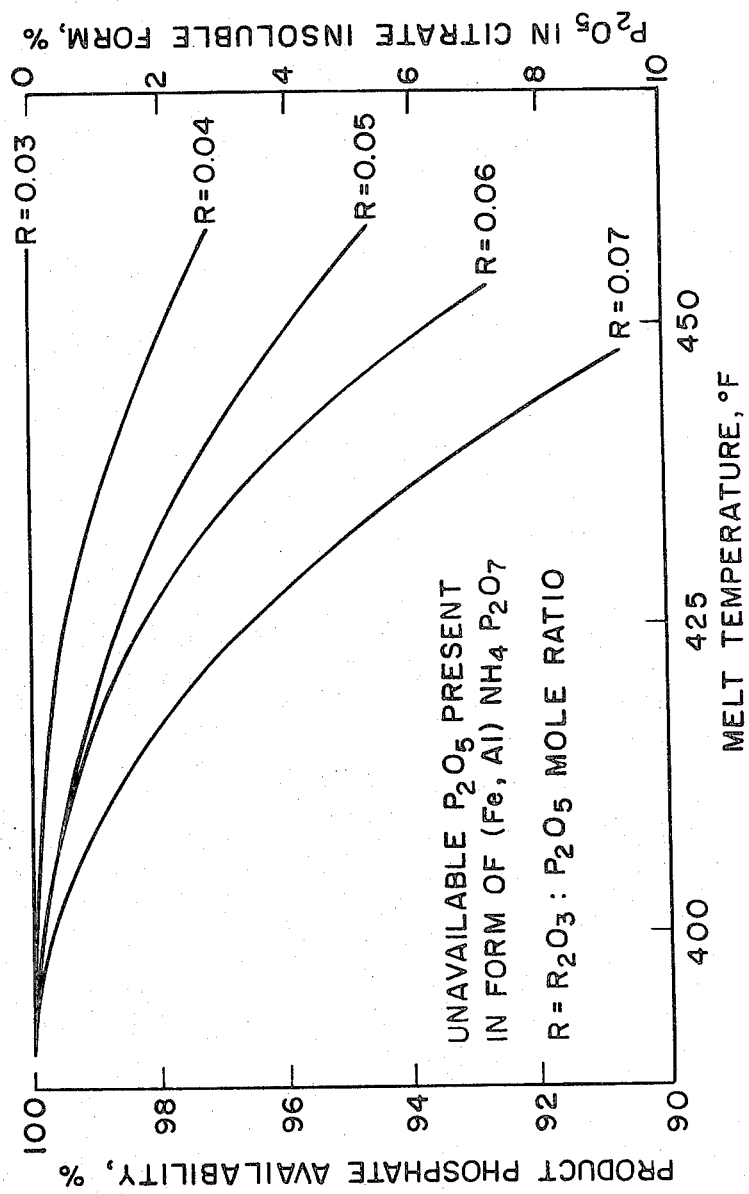

United States Patent Office 3,775,534
Patented Nov. 27, 1973

3,775,534
AMMONIUM POLYPHOSPHATE SOLUTIONS
FROM SUPER WET ACID
Robert S. Meline, Florence, Ala., assignor to Tennessee
Valley Authority
Continuation-in-part of application Ser. No. 126,680,
Mar. 22, 1971, now Defensive Publication T896,056.
This application Nov. 15, 1971, Ser. No. 198,822
Int. Cl. C01b 15/16, 25/26
U.S. Cl. 423—310                    11 Claims

ABSTRACT OF THE DISCLOSURE

Stable liquid fertilizers having 80 percent or more of the total $P_2O_5$ in polyphosphate form are prepared from wet-process superphosphoric acid with a polyphosphate content ranging from the normal amount of about 50 percent down to about only 5 percent. Condensation of the $P_2O_5$ in the acid in the ortho form to the pyro and more highly condensed forms of polyphosphates is accomplished by using the energy available from the heat of reaction of the ammonia and acid. The process is carried out in a simple pipe reactor where the acid and ammonia react to form a melt at temperatures in the range of 600-700° F. The melt is quenched in cooled liquid fertilizer where the additional ammonia required to make the desired $N:P_2O_5$ ratio is fixed and the water required to make the desired grade of fertilizer is added.

Figure 1:
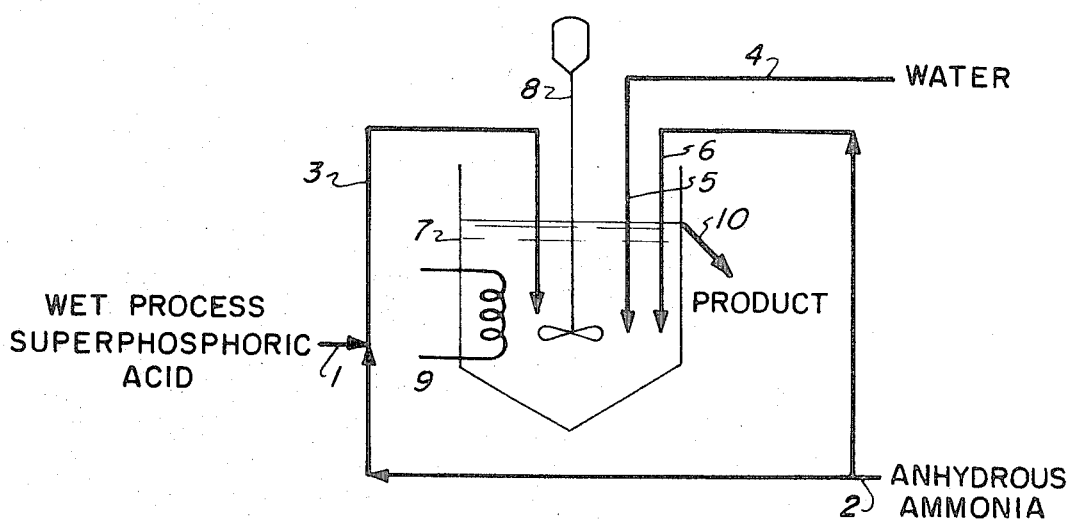

The invention herein described may be manufactured and used by or for the Government for governmental purposes without the payment to me of any royalty therefor.

This application is a continuation-in-part of my copending application Ser. No. 126,680, filed Mar. 22, 1971, for Ammonium Polyphosphate Solutions From Super Wet Acid, now Defensive Publication T896,056.

My invention relates to an improved process for the production of liquid fertilizer base solutions; more particularly it relates to a process of manufacture of highly concentrated liquid fertilizer base solutions produced directly from the ammoniation of phosphoric acid of the wet-process type; and still more particularly it relates to the production of such highly concentrated liquid base fertilizer solutions wherein the polyphosphate content therein ranges upwards of 80 percent, thereby yielding a true fertilizer solution produced exclusively from phosphoric acid of the wet-process type having greatly improved storage, handling, and application characteristics heretofore unobtainable.

Liquid fertilizer base solutions containing nitrogen and phosphorus values and having compositions similar to those of many standard dry mixed fertilizers are well known in the industry and are increasing in popularity. Such solutions have the advantage over dry mixed fertilizers in that costs of evaporating water and bagging are eliminated and application to the soil is greatly simplified. Moreover, the use of liquid fertilizer base solutions eliminates difficulties due to segregation and caking often encountered in the storage of dry fertilizers. Liquid fertilizer base solutions also have an advantage over liquid fertilizer suspensions in that they are better accepted by the ultimate consumer—the farmer—and therefore command a premium price. This is particularly the case when such solutions are made from wet-process phosphoric acid since it has been the experience of some consumers when purchasing suspension fertilizers made from wet-process phosphoric acid that the solid phases therein oftentimes prove to be cryptical in not revealing some inherent undesirable characteristics thereof.

Liquid fertilizer base solutions, although they have many of the advantages enumerated supra, have had some outstanding disadvantages. For example, raw-material costs have been relatively high and the solutions produced early in the development of the art have proven to be so corrosive as to result in high maintenance and storage costs. The solutions also, in the past, have been limited to a maximum plant food content of about 33 percent by weight of $(N+P_2O_5)$ because experience had taught that concentrations in excess of this amount always result in crystallization and precipitation of salts therein. These disadvantages, in many instances, outweighed the benefits derived by elimination of the evaporation and bagging steps associated with dry fertilizers. One of several significant and fairly recent breakthroughs in overcoming these disadvantages in liquid fertilizer base solutions is taught and described in U.S. Letters Patent 2,950,-961, Striplin et al. (I). Striplin discovered that he was able to prepare a liquid mixed fertilizer or base solution containing substantial values of both N and $P_2O_5$ in a process wherein he rapidly and intimately introduces ammonia and superphosphoric acid into a reaction vessel under controlled conditions. As is taught in Striplin (I), superphosphoric acid utilized in his process is ammoniated in such a way that the resulting ammonium polyphasphate salt solutions which comprise liquid fertilizers are proportioned in his product in substantially the same dependent and proportional relationship as are the various species of polyphosphoric acids originally present in his superphosphoric acid feed constituent. He believed that the retention of these species of nonequilibrated polyphosphoric acids as ammonium salt solutions thereof was beneficial in restraining precipitation of salts in his product solutions. The superphosphoric acid used by Striplin (I) may be prepared from any number of processes including that shown in his U.S. Letters Patent 3,015,540, Striplin (II).

Still another method of preparing liquid fertilizer base solutions from wet-process phosphoric acid is found in U.S. Letters Patent 3,015,552, Striplin (III), wherein he ammoniates wet-process phosphoric acid with the simultaneous addition thereto of an aqueous solution of ammonium salts of superphosphoric acid, i.e., the product of Striplin (I).

It should perhaps be noted that in the art so far recited wherein liquid fertilizer base solutions are prepared by the ammoniation of superphosphoric acid or the employment therein, the main disclosure is that the polyphosphoric acid species therein be preserved as well as possible, i.e., hydrolysis of the longer chain species back to the orthophosphate form be prevented as much as possible by a number of means including reacting at relatively low temperatures and by intimately and quickly mixing the reactants. In addition, in processes wherein superphosphoric acid of the thermal or electric-furnace type is employed, the cost factor becomes a major obstacle in that phosphorus values designed for fertilizer use are much more economical when derived from wet-process acid than from acid of the thermal or electric-furnace type. There are, of course, a great number of factors entering into the economics herein, but perhaps the greatest one is the relatively high cost of electricity and coke in operating the electric furnace for winning the phosphorus values from phosphate rock vs. the relatively low cost of making wet-process phosphoric acid by the leaching of phosphorus values therefrom by means of using mineral acids such as sulfuric Striplin himself apparently has recognized this problem as may be seen in his U.S. Letters Patent 3,507,-614, Striplin (IV), wherein he teaches the operation of a thermal phosphoric acid plant and incorporates therein wet-process acid principally for the improved economics thereby derived to produce a blend of thermal and wet-process superphosphoric acid.

In still another fairly recent breakthrough in overcoming some of the disadvantages of liquid fertilizer base solution produced by prior-art methods, there is found still a different approach to the problem, to wit, converting wet-process phosphoric acid of about merchant-grade strength to wet-process acid of the "super" type, i.e., converting orthophosphoric acid derived from the wet process to at least a portion of polyphosphoric acid, or more precisely, acyclic polyphosphoric acid species. This second approach is disclosed in both the application Ser. No. 835,377, filed Aug. 21, 1959, of John G. Getsinger, assigned to the assignee of the present invention, and in U.S. Letters Patent 3,044,851 and sister Pat. 3,192,013, D. C. Young. These disclosures relate to the discovery that if phosphoric acids of the wet-process type of about merchant-grade strength, i.e., orthophosphoric acid, is subjected to evaporating means, either at atmospheric or at subatmospheric or superatmospheric pressure so as to condense the wet acid as well as to remove free water therefrom, the formation of gelatinous precipitates which otherwise render such ortho wet-process phosphoric acid unusable for the preparation of high-analysis liquid fertilizer base solutions are substantially or totally sequestered. In addition, there is taught that if wet-process orthophosphoric acid is so concentrated, it may be subsequently ammoniated to form such fertilizer base solutions in which the congeneric impurities originally present in said wet-process orthophosphoric acid are sequestered and caused to remain in solution, thereby eliminating the formation of such gelatinous precipitates. Thus, Getsinger and Young differ from the approach of Striplin in that they form in situ in ortho wet-process acid the poly acid species which are required to sequester the congeneric impurities in wet process acid whereas Striplin first prepares by controlled hydrolysis of phosphorus vapors a superphosphoric acid which, as made, contains the poly acid species necessary to impart to that acid product the self-sequestering properties, which self-sequestering properties may also be imparted to ortho wet-process phosphoric acid mixed therewith.

Still another approach to the problem is found in a series of patents the last of which being U.S. Pat. 3,336,-127, Hignett and Getsinger, wherein superphosphoric acid and ammonia are reacted under high temperatures and pressures to produce a molten melt which is subsequently solidified to a hard mass and which still later can be dissolved in water or in water and ammonia to produce relatively high-analysis liquid fertilizer base solutions. The principal disadvantages of this process are (1) the high cost of superphosphoric acid when it is of the electric-furnace type, and (2) the cost of equipment and operation including cost of cooling under the conditions of high temperature and pressures therein disclosed.

Still another and more recent breakthrough in overcoming several of the disadvantages of the art enumerated supra is found in U.S. Letters Patent 3,382,059, Getsinger, wherein Getsinger attempts to produce liquid fertilizer base solutions from orthophosphoric acid of the wet-process type and ammonia wherein he circumvents or eliminates the separate heating and concentrating step found in his earlier referred to application and the disclosure of Young. In this later work Getsinger has discovered that by a direct process of combining orthophosphoric acid of the wet-process type and anhydrous ammonia in a direct method he is able to utilize the autogenous heat of reaction therein to effect the release of water from such acid whereby same is condensed while it is being ammoniated to form directly without the separate heating and concentrating step ammonium polyphosphate solutions. Although this teaching of Getsinger is a substantial improvement over the art and has been the focal point of much interest by the industry, it too has certain drawbacks one being that it appears to be best operable where relatively clean wet acid is utilized as a feed constituent therein, and the second and most important being that there is only enough autogenous heat of reaction to produce a liquid fertilizer base solution having in the neighborhood of 30 to about 50 percent of its phosphorus values converted to the form of acyclic polyphosphate species, i.e., the remainder being orthophosphate, which has proved to be somewhat marginal for insuring that the congeneric impurities usually present in the wet orthophosphoric acid feed constituent do in fact remain sequestered during subsequent storage and handling of the product. Also, experience with operation of the process of Getsinger has shown that copious foaming in the reactor oftentimes inhibits the continuous operation thereof. An improvement on this disclosure of Getsinger is found in a number of pending applications by Meline and Lee, the latest of which is Ser. No. 11,060, filed Feb. 13, 1970, and assigned to the assignee of the present invention. Meline et al. carry out the direct process of Getsinger but incorporate in their process the use of a common line or inline mixer usually having the general configuration of a T and a novel item of equipment to separate steam and unreacted ammonia from the T product. Although they do not claim that the use of a common line mixer is in itself new, their combination of equipment and process steps yields a liquid base fertilizer of higher analysis than they are able to obtain by using the tank reactors of Getsinger. They, too, have encountered a number of problems with foaming and have directed much of the thrust of their disclosure to means and methods useful in overcoming such foaming problems including several defoaming apparatus and the use of a slight vacuum throughout the system. Operation of their process, however, also yielded solutions having only marginal polyphosphate species therein which subsequently cause them to operate their pilot plant in a manner to produce fertilizer suspensions rather than true solutions. However, as noted early in this disclosure, such suspensions do not command the premium price as do solutions and therefore, under present conditions, are not nearly as desirable as a marketable product.

Still a more recent alleged breakthrough in producing true liquid fertilizer base solutions appears in the disclosure of U.S. Letters Patent 3,464,808, Kearns. Kearns discloses that the indirect approach or method, such as in the Getsinger application and the patents to D. C. Young, has the disadvantage in that the wet-process super acid thereby produced is a premium chemical as large amounts of free molecularly combined water must be evaporated. He therefore proposes that an answer to the problem of preparing true liquid fertilizer base solutions from wet acid may be accomplished by using a so-called jet reactor to which he feeds anhydrous ammonia and "enriched" wet-process phosphoric acid, i.e., acid higher in phosphorus values than ordinarily obtainable merchant-grade acid, but not so enriched as to put it in the category of super wet acid. Although the disclosure of Kearns does not reveal wherefrom or how he obtains his enriched feed acid, information distributed by his assignee indicates that such enriched wet-process phosphoric acid can be obtained by either further concentrating merchant-grade wet-process acid by driving water therefrom to concentrate same upwards from the merchant-grade range to just under the super range, not unlike the processes of Getsinger and Young except just a little short thereof, or alternatively, by adding to commercially available merchant-grade orthophosphoric acid of the wet-process type amounts of thermal super acid such as that produced in Striplin (II). Another requirement of Kearns is that his enriched feed phosphoric acid be preheated to a temperature upwards to about 180° F. before reaction with the anhydrous ammonia. Experience with the disclosure of Meline and Lee, supra, indicates that this is reasonable in that they normally preheat their ortho wet acid upwards to about 250° F.

A comparison of the so-called jet reactor of Kearns and the common line mixer of Meline and Lee indicates that they apparently are not the same in operation. By Kearns' definition, his so-called jet reactor is operated under substantial pressure such that his molten product exits therefrom at a velocity of at least 50 m.p.h. However, it should be noted that Kearns reports a rather high degree of conversion of the ortho form to the nonortho form, to wit, 40–80 percent. This degree of conversion is higher than that obtainable by any of the processes described supra except wherein at least a portion, if not all, of the polyphosphate species are derived from electric-furnace superphosphoric acid. Certainly the degree of conversion is higher than that obtained in Getsinger '059, wherein he reports as much as 45 percent conversion, or in Meline and Lee wherein experience has shown that the degree of conversion in the general range of about 50 percent. It should, however, be understood that this high degree of conversion oftentimes apparently is obtained by incorporating into wet-process orthophosphoric acid substantial amounts of thermal or electric-furnace superphosphoric acid, itself a premium priced chemical, or alternatively, by going through all of the extra procedure of Getsinger's application and Young's patents of separately further concentrating merchant-grade acid, but only to enrich same up to but not into the super acid range.

Accordingly, at the present time those engaged in the manufacture of liquid fertilizer base solutions from wet-process phosphoric acid, even with the benefit of all of the prior art and recent breakthroughs discussed in detail supra, are basically following at the present time the following procedure. Merchant-grade strength, i.e., ortho wet-process as well as wet superphosphoric acid, is reacted with ammonia and water and supplemented with an aqueous solution of ammonium salts of electric-furnace superphosphoric acid, to wit, normally 11–37–0. The reaction of ammonia, water, and wet acid may be alone or simultaneous with the addition of the 11–37–0, as in Striplin (III) supra. The reactions are carried out rapidly and at relatively low temperatures to preserve the polyphosphate species supplied by the 11–37–0, which polyphosphate species effect the sequestration of the congeneric impurities in the wet acid. This procedure is apparently the best compromise that the industry has been able to come up with to the present time, to wit, utilizing as much as possible the less expensive phosphorus values of wet acid, and yet overcoming the formation of gelatinous impurities associated with the ammoniation thereof by combination therewith the ammoniated electric-furnace superphosphoric acid product 11–37–0 or, in some instances, 12–40–0. In following this procedure if the manufacturer is going to ensure that his product will have the sequestering properties necessary for the subsequent handling, storage and application, he must use as in Striplin (III) upwards to 30 percent of the phosphorus therein derived from the 11–37–0. Such a procedure is at best a compromise in both quality of product and the cost of producing same.

I have now discovered that I am able to produce liquid fertilizer base true solutions by the ammoniation of wet-process phosphoric acid wherein I am able to attain degrees of conversion of the orthophosphate form to the nonorthophosphate form, or more specifically the acyclic polyphosphate forms of at least 80 percent and higher, which fertilizer base solutions are eminently suitable and characterized by their ability to self-sequester the congeneric impurities in such wet-process acid during long term storage, handling, and application under all types and degrees of adverse climatic conditions.

Further, I have found that I am able to produce such improved fertilizer solutions without resorting to the use of any of the more expensive prime chemical electric furnace superphosphoric acid by a process which requires no preheating of the feed constituents, and is carried out at atmospheric pressure without any accompanying problems of foaming. Furthermore, my process is not predicated on the proposition of reacting ammonia and wet-process superphosphoric acid at relatively low temperatures to preserve the distribution of any species in the super acid, but rather the objects of my invention were attained by actually reacting wet-process superphosphoric acid and anhydrous ammonia without any preheat thereof at relatively high autogenous tempertures to thereby increase rather than just preserve the polyphosphoric acid species in the resulting ammonium polyphosphate salt solutions thereof. This is contrary to the prior-art teachings of producing liquid fertilizers from superphosphoric acid and ammonia wherein the feed constituents are introduced into the liquid reactor vessel at controlled rates in separate streams.

In my new improved process, wet-process superphosphoric acid, i.e., acid containing at least some nonortho species and all or part of the ammonia to be reacted therewith are introduced into the solution reactor vessel through a common pipe. The initial phase of the neutralization occurs in this common pipe, and the heat liberated is sufficient to convert the product of reaction to a melt and drive off small amounts of the water chemically combined (no free water present) with the phosphorus values in the orthophosphate form thereby converting substantial percentages of additional phosphorus therein to the polyphosphate form. The temperature of reaction is sufficient so that the liberated water cannot recombine with the polyphosphate to form orthophosphate. The resulting melt thus produced is then quickly quenched, dispersed, and dissolved in the liquid fertilizer solution contained in the reactor or vessel which I normally operate in the temperature range of about 160° to 180° F., and preferably in the range of about 130° to 150° F., with little or no hydrolysis resulting in the polyphosphate product, particularly when operated at the lower temperature range. With this type of operation, I have found that I am able to produce liquid fertilizer solutions containing at least 80 percent of its phosphorus values in the polyphosphate form even when the feed superphosphoric wet acid contains as little as about a few percent of the acyclic polyphosphate species.

Accordingly, it is an object of the present invention to produce improved ammonium polyphosphate fertilizer base solutions exclusively from wet process superphosphoric acid which solutions possess congeneric impurity-sequestering characteristics far superior to fertilizer base solutions heretofore produced without the benefit of electric-furnace superphosphoric acid.

Another object of the present invention is to produce improved ammonium polyphosphate fertilizer base solutions exclusively from wet-process phosphoric acid, which solutions possess congeneric impurity-sequestering characteristics far superior to fertilizer base solutions heretofore produced without the benefit of electric-furnace superphosphoric acid, and wherein the ultimate conversion of the orthophosphate to the nonorthophosphate form is at least as great as 80 percent.

Still further and more general objects and advantages of the present invention will appear from the more detailed description set forth below, it being understood, however, that this more detailed description is given by way of illustration and explanation only and not by way of limitation, since various changes therein may be made by those skilled in the art without departing from the true spirit and scope of the present invention.

In general, it is now considered important in producing liquid fertilizer solutions from wet-process acid to have a substantial amount of the polyphosphate values in the long-chain form, as compared with having most of said polyphosphate in the pyrophosphate form, which pyrophosphate form is the predominant polyphosphate form contained in now commercially available wet-process superphosphoric acids which are limited under present processing conditions because of temperature and viscosity limitations to a maximum of about 50 percent polyphosphate. At this 50 percent polyphosphate level, iron and aluminum metallic impurities are sometimes substantially sequestered, but this is not the case with the impurity magnesium. Studies now have shown that the more condensed polyphosphate, tripolyphosphate, is 70 times more effective in sequestering the magnesium impurity than is the pyrophosphate species. These studies have also shown that the amount of longer chain polyphosphates including tripolyphosphate in the product increases as the amount of total phosphate in the acid increases. This will be readily apparent to the reader by the reference to the Canadian Journal of Chemistry, Striplin (I), supra.

Magnesium is known to be present in all non-igneous phosphates which are the major sources of phosphates throughout the world. The troublesome precipitation of impurity compounds from liquid fertilizers made from acids derived from such rock sources always includes compounds of magnesium. The greater sequestering power of the higher polyphosphates on magnesium, for instance tripolyphosphate, has been the prime reason that phosphate values from thermal or electric superphosphoric acid which contains these more highly condensed polyphosphate species is now included in the production of liquid fertilizer solutions made primarily from the ammoniation of wet-process super-phosphoric acid.

It will now be seen that utilization of the present invention will completely eliminate the need for the more costly thermal or electric super-phosphoric acid, or for that matter, the more expensive so-called purified wet-process phosphoric acid which results from the so-called solvent extraction processes when producing liquid fertilizer base solutions from wet-process superphosphoric acid. Data from the initial tests of my studies as reported in my parent application lead me to conclude that the distribution of polyphosphate species in the liquid fertilizer produced from wet superphosphoric acid according to this invention would be about equal to that made entirely from thermal super acid as in Striplin (I) (see Table I introduced infra). Although the data in this table show a larger portion of the polyphosphate species to be in the more highly condensed form than the pyro than would be expected if the liquid fertilizer were made entirely from thermal super acid as in Striplin (I), I did not consider this sufficient deviation to be sufficient to warrant noting a change from the expected species distribution. However, in subsequent tests it was unexpectedly found that the amount of pyrophosphate in the species distribution was consistently significantly less and the amount of polyphosphates in the more highly condensed form were consistently significantly greater than in liquid fertilizers produced entirely from thermal super acid as in Striplin (I) (see Table II introduced infra).

My studies have also shown that although it may be desirable to use as the feed acid to my process a wet super acid sufficiently concentrated so as to render same stabilized against formation of precipitates upon long-term storage or upon ammoniation and long-term storage by conventional means, I am able to utilize in my process a wet super acid which contains only marginal amounts of polyphosphate species therein and which, when first produced, is free of precipitates but which, upon such long-term storage, hydrolyzes and degradates to an otherwise undesirable form. Thus, I believe that for the first time my process finds an outlet and use for wet-process superphosphoric acid of the nonequilibrated type defined and referred to by Young in the '013 patent, supra. As an alternate to my invention, thermal superphosphoric acid can be used with wet orthophosphoric acid to give a feed acid with the desired polyphosphoric level or thermal superphosphoric acid only containing the desired level of polyphosphate could be used.

Since my invention may utilize wet-process superphosphoric acid that contains only about 10 to about 30 percent of the $P_2O_5$ as polyphosphates instead of the usual 40 to 60 percent required by prior-art processes, my invention can result in simplification and economies in the cost of production of the wet-process superphosphoric acid. For the usual wet-process superphosphoric acid, production process by vacuum concentration of orthophosphoric acid containing about 54 percent $P_2O_5$, two stages of evaporation are required. For the first stage of evaporation, the expensive and troublesome Dowtherm system must be used as the heat source because the temperatures required exceed those obtainable in the usual way from steam. Also, the high temperatures required in the second stage result in severe corrosion of the evaporation tubes, with this corrosion being so severe that tubes made of expensive Alloy 20 are reported to last only about 3 years. With the use of my process, the less concentrated superphosphoric acid can be produced with only the single first stage of evaporation with steam as the heat transfer medium, and the resulting cost of superphosphoric acid will be substantially lowered.

In practicing the instant invention, I have also observed another unexpected and highly desirable property of the product therefrom wherein the melts produced by this method were not introduced into a liquid solution vessel, but rather allowed to solidify or crystallize and become very hard, friable solids upon cooling. This property, of course, will be of great importance when it is desired to convert the melt directly to a solid product. This is unlike the melts produced directly from ortho acid and containing phosphorus values in the polyphosphate form of about 50 percent of the total in that they require long periods of aging or high degrees of mechanical working to convert the melts to hard, friable solids. Also, the Hignett and Getsinger references, supra. show that the properties of such melts prepared for super acid and ammonia in an autoclave under high pressures require great amounts of mechanical working. Of course, the melt produced by my invention can be solidified by any of the means that use mechanical working, such as a pugmill, even though this working is not required for crystallization.

In carrying out my invention, I have determined that the amount of energy released by the reaction, temperature of the reaction, and the amount of polyphosphate formed, as well as the amount of long-chain polyphosphates formed are dependent upon the degree of reaction obtained in the common pipeline used for introduction of the reactants into the solution reactor. The degree of reaction can be easily monitored by using the temperature of reaction as a guideline and controlled by the proportion of the total ammonia required introduced through the common pipeline.

My invention, together with further objects and advantages thereof will be better understood from a consideration of the following description taken in connection with the accompanying drawing in which:

FIG. 1 is a flowsheet generally illustrating the principles of my novel process which result in the direct production exclusively from wet-process superphosphoric acid of true fertilizer base solutions containing at least 80 percent conversion of the phosphorus values therein to the polyphosphate form including substantial amounts of tripolyphosphate as well as species more condensed than said tripolyphosphate.

Figure 2:
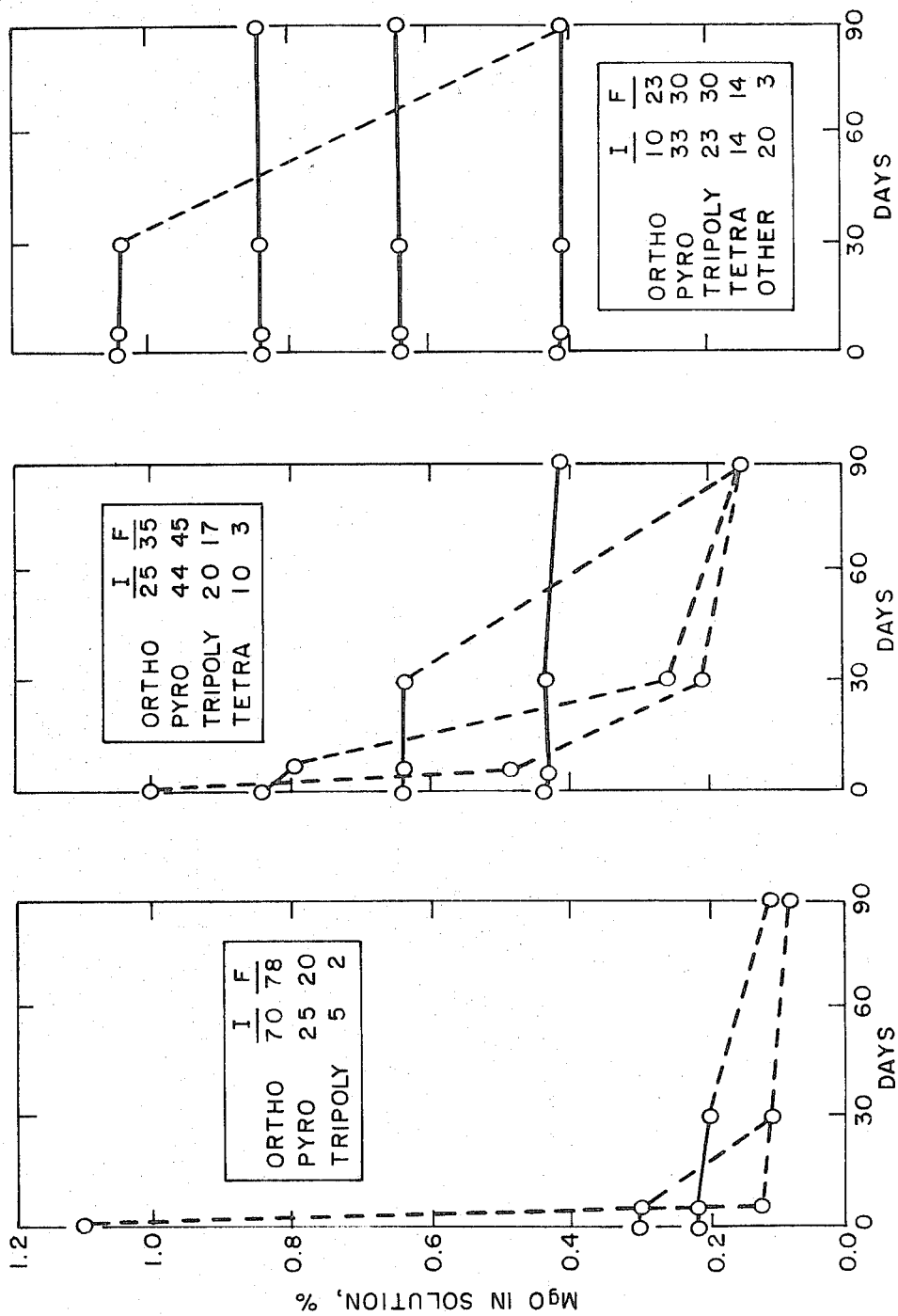

FIG. 2 illustrates graphically the effects of polyphosphate and initial magnesium contents on the solubility of magnesium in 10-34-0 solutions. In this study, these effects of polyphosphate on magnesium only was of prime interest rather than the effects on the other principal impurities, iron and aluminum. Consequently, pure solutions were first prepared, for example, by dissolving $P_2O_5$ in distilled water and then adjusted to simulate wet-process super acid only to the extent of adding the single impurity—magnesium—in the form of magnesium carbonate but eliminating any additions of iron and aluminum for the purpose of these studies. The results of these studies are shown in this FIG. 2 in a three-part correlation with the broken lines connecting data points indicating that precipitation of magnesium occurred during the indicated time intervals. The precipitating phase was identified microscopically and analytically as $Mg(NH_4)_2P_2O_7 \cdot 4H_2O$. The legend for each of the three groups shows the distribution of the total phosphate between orthophosphate and total condensed phosphates in both the initial solutions (I) and the final solutions (F) after three months' equilibration. From this three-part correlation, it will be appreciated the need for the minimum of about 80 percent polyphosphate to sequester the magnesium impurity with the last group showing an initial solution having 90 percent conversion and holding in excess of 0.8 percent MgO in solution through the 90-day period of testing.

FIG. 3 illustrates the effect of the temperature of reaction and the $R_2O_3:P_2O_5$ mole ratio of the feed acid on the amount of citrate insoluble compounds formed in the anhydrous melt process for producing polyphosphates. This data is from earlier TVA pilot plant work.

Referring now more specifically to FIG. 1, wet-process phosphoric acid from a source not shown is fed via line 1 to common feed line 3, together with anhydrous ammonia from a source not shown via line 2 to common feed line 3. A partial reaction of the wet-process superphosphoric acid and ammonia occurs in common feed line 3 to form ammonium polyphosphate in the form of a melt and to remove a portion of the chemically combined water in the feed acid to thereby increase the polyphosphate content of the melt over that originally in the feed acid in line 1. The amount of ammonia fed via line 2 to common feed line 3 ranges in amounts up to 100 percent of that required to convert the wet-process superphosphoric acid to the desired material, such as, for example, an 11-37-0 liquid fertilizer solution. The amount of additional polyphosphate formed from an acid of specific polyphosphate content in common line 3 can be controlled by the proportion of ammonia fed to liquid reactor vessel 7. As the proportion of ammonia fed in this manner is increased, the amount of polyphosphate formed, of course will be increased. The proportion of ammonia not fed through common feed line 3 is fed through independent ammonia feed line 6 to liquid fertilizer vessel 7. Common feed line 3 discharges below the surface of the liquid fertilizer solution in vessel 7. The water, at a rate required to maintain the composition of the liquid fertilizer produced at the desired fertilizer grade is fed from a source not shown through water supply line 4 to below the surface of the material in vessel 7 via line 5. The liquid volume contained in vessel 7 is maintained under heavy agitation by agitation means generally illustrated at 8. The violent or heavy agitation quickly disperses the incoming melt, unreacted ammonia, and free water from common feed line 3 and the water from feed lines 4 and 5 and the portion of ammonia, if any, supplied through auxiliary ammonia feed line 6. All feed materials are quickly dispersed and dissolved so that the contents of vessel 7 is essentially homogeneous throughout. A cooling system generally illustrated at 9, either external or internal, is provided to maintain the liquid in the reactor in vessel 7 in a temperature range of about 180° F., or less. Liquid fertilizer solution product, which may be 10-34-0, 11-37-0, or 12-40-0 grades, continuously discharges from vessel 7 through discharge means generally illustrated for purposes of this invention as overflow type discharge line 10. The liquid fertilizer solution product thus produced may be used directly, may be used as a base material for further processing, or may be sent to storage. I have found that it is desirable, for the purpose of preventing hydrolysis of the polyphosphates contained in the liquid fertilizer solution discharged from vessel 7 via line 10, to provide additional cooling of the product if sent to storage down to the range of about 110° F. to about 120° F.

In order that those skilled in the art may better understand how the present invention can be practiced, the following examples of processes I have used in the production of high-analysis liquid fertilizer base solutions by the direct ammoniation of only wet-process superphosphoric acid containing upwards of a few percent nonortho species therein are given by way of illustration and not by way of limitation.

EXAMPLE I

While waiting for supplies of wet-process superphosphoric acid to be run in the pilot plant, I had simulated several wet-process phosphoric acids by diluting electric-furnace superphosphoric acid to the desired polyphosphate contents and adding the principal impurities normally found in wet acid, to wit, iron, aluminum, and magnesium. In one of the tests made from this simulated wet-process phosphoric acid, the polyphosphate content thereof was 29 percent. This simulated acid and anhydrous gaseous ammonia were injected at ambient temperatures into the common pipe leading to the solution vessel. In this test wherein I was shooting for a 10-34-0 product, I added only 66 percent of the ammonia required therefor through the common line with simulated acid and the remaining one-third of ammonia was fed from the alternate line directly into the solution vessel. The temperature in this test in the common pipe was rather low, i.e., 605° F. Due to the use of only two-thirds of the ammonia with the acid and the accompanying relatively low temperature in the common line, the polyphosphate content of the melt therein produced was only about 75 percent of the total $P_2O_5$. In a sister test wherein the same conditions were held except that all of the ammonia required was sent and combined with the simulated acid in the common line, the temperature was in excess of 650° F. and the polyphosphate content of the melt was about 90 percent of the total.

EXAMPLE II

At the time of this test, I had a supply of wet-process superphosphoric acid from source A, which superphosphoric acid was not highly concentrated, containing only 7 percent of its phosphorus values in the polyphosphate form. This wet super acid was injected into the common pipe carrying the acid and ammonia to the liquid fertilizer solution reactor. Simultaneously, ammonia at a rate equivalent to 75 percent of that required to produce a 10-34-0 product was also introduced into the common pipe, with the remaining 25 percent of the ammonia required introduced into the reactor in a separate stream. In this test, the temperature of reaction was held at 625° F. and the polyphosphate content of the melt thus produced was about 70 percent of the total.

Although the first test reported in Example I and the test reported in Example II, supra, resulted in ammonium polyphosphate product having conversions of the orthophosphate to the nonorthophosphate form upwards of 70 and 75 percent of the total, I look at these tests really as negative examples in that I prefer and desire that at least 80 percent of the phosphorus values be converted to the polyphosphate form. This minimum of at least 80 percent conversion to poly is critical in order to ensure that there is a proper balance of sufficient tripolyphosphate and more condensed species available to sequester the magnesium impurity and yet at the same time ensure a sufficient quantity of pyrophosphate species for effecting sequestration of the iron and aluminum impurities. Accordingly, the following examples show how this was accomplished through the expedient of conducting all of the ammonia required for the grade desired to be produced through the common pipe along with the wet-process superphosphoric acid.

EXAMPLE III

Wet-process superphosphoric acid containing 7 percent of its phosphorus values in the polyphosphate form was introduced into the common pipe which carries the acid and ammonia to the liquid solution reactor. Ammonia at a rate equivalent to 100 percent of that required to produce a 10-34-0 grade product was introduced into the common pipe. Of course, in this example, as in the previous examples, the requisite amount of water to produce the desired grades was introduced separately to the reactor. In this test the temperature reaction in the common pipe was 640° F. and the polyphosphate content of the melt thus produced was 87 percent of the total phosphorus values therein.

EXAMPLE IV

In this test, I prepared a fertilizer solution from a composite of melts from Examples II and III, supra, inasmuch as I was running out of this particular acid for operating the pilot plant. The solution reaction tank in which the melts were introduced was maintained at a temperature of 160° F. by circulating cooling water through a coil located within the tank. The contents of the tank were vigorously agitated. The melt from which the liquid fertilizer solution was produced was a composite consisting of about 30 percent from Example II and 70 percent from Example III. The composite product was intended to be a fertilizer solution of about a 10-34-0 grade. Chemical analysis showed the solution to contain 9.8 percent N and 35.1 percent phosphorus, expressed as $P_2O_5$, with 80 percent of the phosphorus converted to the polyphosphate form.

EXAMPLE V

A series of tests were run similar to those conducted in Example III supra using wet-process superphosphoric acid containing only 7 percent of its phosphorus values in the polyphosphate form. In these tests, 100 percent of the ammonia required was fed through the common pipe line along with this acid. Sufficient water was added by means of a separate stream to the solution tank in combination with said ammonia and acid to produce 11-37-0 fertilizer solutions. The reaction temperatures in the common pipe ranged from about 635° F. to about 660° F. and the polyphosphate content of the resulting solution products were all in excess of 80 percent.

EXAMPLE VI

From Examples II-IV, supra, and from tests wherein I made a 10-34-0 grade using wet superphosphoric acid wherein the acid and ammonia entered the reactor through the prior-art means of individual pipes as well as wherein I made a 11-37-0 grade from thermal superphosphoric acid by the established route, to wit, of introducing the acid and ammonia through individual pipes as opposed to the common pipe of the instant invention, I am able to compare in the following Table I the polyphosphate species distribution as percent of total phosphorus by the prior-art methods as well as by the instant invention, wherein it may be seen that the 10-34-0 made by the instant invention contains the distribution of polyphosphate species more condensed than pyrophosphate in proportions exceeding that of 11-37-0 made excusively from the more expensive thermal or electric superphosphoric acid, it being noted that the acids used in Examples II-IV, as well as Example V, i.e., my wet-process superphosphoric acid containing only about 7 percent polyphosphate, or more specifically 7.6 percent, had the following analyses: total $P_2O_5$, 68.2 percent; ortho $P_2O_5$, 60.6 percent; nonortho $P_2O_5$ by difference, 7.6 percent; $Fe_2O_3$, 1.8 percent; $Al_2O_3$, 0.64 percent; MgO, 0.99 percent, and fluorine, 0.17 percent, all percentages by weight.

TABLE I.—PHOSPHATE SPECIES DISTRIBUTION, PERCENT OF TOTAL $P_2O_5$

|  | 10-34-0 from above acid by use of common pipe | 10-34-0 from wet super acid by established route [1] | 11-37-0 from thermal super by established route [1] |
|---|---|---|---|
| Ortho | 20.4 | 52 | 19 |
| Pyro | 37.0 | 36 | 44 |
| Tri | 22.8 | 7 | 24 |
| Tetra | 10.0 | 4 | 9 |
| Penta | 5.1 | | |
| Hexa | 2.1 | | |
| Hepta | 1.2 | | |
| Octa | 0.7 | | |
| Other | 0.6 | 1 | 1 |

[1] Acid and ammonia enter reactor through individual pipes, i.e., prior-art route.

EXAMPLE VII

In this series of tests, I cooled a sample of the melt produced during the operation as described in Example III, supra. I observed that the melt solidified to a friable solid immediately upon cooling, i.e., a few minutes, and contained 10.2 percent N, 65.3 percent phosphorus expressed as the oxide, and had 87 percent of the phosphorus therein converted to the polyphosphate form. If this melt had been produced by conventional means wherein wet-process superphosphoric acid containing the usual maximum of about 50 percent conversion to the polyphosphate form were added—not through the common pipe as in my invention—or formed at elevated pressures, as in Hignett and Getsinger, supra, the resulting melt, if not intensively worked and agitated as, for instance, in a pugmill, will require up to several days of aging before the resulting amorphous solid would be converted to a crystalline friable solid suitable for later production of fertilizer solutions by dissolving same in water or in water and ammonia.

EXAMPLE VIII

In this series of tests, a supply of acid obtained from commercial source B was used. The acid contained 71.8 percent $P_2O_5$ with 49 percent of the phosphorus values in the polyphosphate form, 0.8 percent MgO, 1.4 percent $Fe_2O_3$, 2.3 percent $Al_2O_3$, and 0.1 percent F. The acid and 100 percent of the ammonia required to make an 11-37-0 liquid fertilizer (weight ratio acid to $NH_3$ equal to 3.8) were fed to the T-section of the common pipe carrying the reactants to the liquid fertilizer solution reactor. The pipe discharged into the reactor below the surface of the liquid fertilizer and at a point just above the outer periphery of the agitator in the reactor to ensure rapid disbursement and dissolution of the melt formed in the common pipe.

A portion of the acid was fed to the common pipe reactor at the original concentration of 71.8 percent $P_2O_5$ and the remainder, after predetermined dilutions at concentrations equal to 70.5, 68.8, 67.8, and 66.3 percent $P_2O_5$ values were derived by adding the required amount of water to a portion of the original acid to obtain the concentrations listed above. Of course, in this example, as in the previous examples, the requisite amount of water to produce the desired 11-37-0 liquid fertilizer was introduced separately into the liquid fertilizer reactor; see table below for quantities of acid, ammonia, and water required per ton of product.

RAW MATERIALS REQUIRED IN POUNDS PER TON OF 11-37-0 PRODUCT

| Test No. | Acid | $NH_3$ | $H_2O$ |
|---|---|---|---|
| 71 | 1,031 | 267 | 703 |
| 70 | 1,050 | 267 | 683 |
| 69 | 1,076 | 267 | 657 |
| 68 | 1,091 | 267 | 642 |
| 67 | 1,116 | 267 | 617 |

When using the acid at the concentration of 71.8 percent $P_2O_5$ with no dilution water added, the temperature of reaction at a point 5 feet above (downstream) the midpoint of the pipe T where the acid and ammonia were introduced into the common pipe, i.e., in FIG. 1 where line 3 breaks to the horizontal was 635° F., and a sample of the melt obtained at the same point showed 96 percent of the phosphorus values in a polyphosphate form. In the liquid fertilizer produced from this melt, 94 percent of the $P_2O_5$ values was in a polyphosphate form. Since the amount of acid available for these tests was not sufficient to allow the composition of the liquid fertilizer to come to equilibrium after each change in concentration of the acid, samples of the melt only were obtained for each remaining acid concentration used for evaluation of the amount of polyphosphate produced at each acid concentration. In the following table the acid $P_2O_5$ concentration, the portion of the $P_2O_5$ contained in the acid in the polyphosphate form, the temperature of reaction, the portion of the $P_2O_5$ contained in the melt in the polyphosphate form, and the raw material requirements are shown. As was the case when using the undiluted acid, the temperature of reaction was measured and the melt sample obtained at a point 5 feet above (downstream) the pipe T through which the reactants were introduced into the common pipe.

| Test No. | Acid Total $P_2O_5$, percent | Acid $P_2O_5$ in polyphosphate form, percent of total | Temperature of reaction, ° F. | $P_2O_5$ in melt in polyphosphate form, percent of total |
|---|---|---|---|---|
| 71 | 71.8 | 49 | 635 | 96 |
| 70 | 70.5 | 33 | 625 | 94 |
| 69 | 68.8 | 17 | 615 | 90 |
| 68 | 67.8 | 10 | 695 | 86 |
| 67 | 66.3 | 5 | 575 | 80 |

EXAMPLE IX

In this series of tests, acids from the four major sources of phosphate rock in the United States were used. Included were acids made from rock from North Carolina, Idaho, central Florida, and north Florida. Analyses of the acids are listed below.

| | Source of rock from which acid was made | | | |
|---|---|---|---|---|
| | North Carolina | Idaho | North Florida | Central Florida |
| Composition of acid, percent: | | | | |
| $P_2O_5$ | 70.2 | 72.9 | 73.0 | 70.5 |
| $Fe_2O_3$ | 1.0 | 0.7 | 1.4 | 1.6 |
| $Al_2O_3$ | 1.0 | 1.3 | 2.3 | 1.1 |
| MgO | 0.58 | 0.75 | 0.8 | 0.50 |
| F | 0.24 | 0.2 | 0.1 | 0.17 |
| $SO_4$ | 4.4 | 2.5 | | 1.3 |
| CaO | | 0.9 | | 0.04 |
| W.I. solids | 0.02 | | | 4.0 |
| $P_2O_5$ in polyphosphate form, percent | 43 | 41 | 57 | 53 |

In each test the common pipe reactor and the liquid fertilizer solution reactor were operated as described in Example VIII with the exception that only 60 to 75 percent of total ammonia required for the 11–37–0 was fed through the pipe reactor and the remainder of the ammonia directly to the liquid fertilizer vessel. Analyses of the liquid fertilizers produced and the species distribution of the polyphosphates are shown in Table II.

TABLE II.—LIQUID FERTILIZER ANALYSIS AND PHOSPHATE SPECIES DISTRIBUTION OF $P_2O_5$

| Acid source | Liquid fertilizer analysis, percent | | Phosphate species distribution, percent | | | | |
|---|---|---|---|---|---|---|---|
| | N | $P_2O_5$ | Ortho | Pyro | Tri | Tetra | Other |
| North Carolina | 11.1 | 37.2 | 16 | 25 | 23 | 15 | 21 |
| Idaho | 11.2 | 37.1 | 18 | 28 | 23 | 14 | 17 |
| North Florida | 10.9 | 37.5 | 20 | 32 | 22 | 10 | 16 |
| Central Florida | 11.1 | 38.8 | 15 | 27 | 24 | 13 | 21 |

The above analyses conclusively show that the polyphosphate species distribution in the products made from all acids tested is such that the portion of pyro is much less, and the portion more condensed than pyro is much greater than would be predicted by Huhti and Gartaganis, supra, i.e. from the data advanced by Huhti et al. (albeit for the acid species) one would expect to find a product having 80–85 percent polyphosphate from 41–44 percent of the pyro species and from 36–44 percent of the tripoly and more highly condensed species. In the product of my invention, the unexpected presence of greater amounts of the long-chain species appears to be at the expense of the pyro species and hence my product contains from about 32–25 percent of the pyro and from about 48–60 percent of the tripoly and more highly condensed species. Thus, it appears that I have discovered a process which produces a composition of matter heretofore not attainable from ammoniating wet super acid or, for that matter, ammoniating furnace super acid. A comparison of the ranges supra indicates that I get upwards of 50 percent more of the more highly condensed poly species from the tripoly up than would be expected from the teachings in the literature.

EXAMPLE X

In my earlier work as reflected in my parent application of which this is a continuation-in-part, I operated the pilot plant equipped with a pipe reactor assembled from standard 1-inch pipe and fittings. With this design, the pilot plant normally would operate for about a shift and a half before some scale formation in the pipe reactor warranted inspection or shut-down for cleaning out. In my later work, I jacketed the pipe reactor for water cooling and operation thereof to provide for cooling of the inner pipe reactor surface to a temperature of 400° F. or less. The cooling of the pipe reactor improved its characteristics to the point that plugging or buildup on the inside wall of undesired and unwanted reaction products, principally $(Fe, Al)NH_4P_2O_7$, were reduced to a point where the problem was minor. This result would be expected on examination of the data shown in FIG. 3. In this data, the unavailable portion of $P_2O_5$ is in the form of $(Fe, Al)NH_4P_2O_7$, and at a temperature of 400° F. the formation of $(Fe, Al)NH_4P_2O_7$ is essentially eliminated. Somewhat similar data (albeit 425° F. vs. 400° F.) is shown in FIG. 2 of U.S. Letters Patent 3,562,778, Siegel et al., asigned to the assignee of the present invention.

While I have shown and described particular embodiments of my invention, modifications and variations thereof will appear to those skilled in the art. I wish it to be understood, therefore, that the appended claims are intended to cover such modifications and variations which are within the true scope and spirit of my invention. That further, although the above examples have been limited to a wet-process superphosphoric acid containing about 7 percent acyclic polyphosphate species therein, most likely the bottom limit for such an acid wherein I can obtain at least 80 percent conversion to the polyphosphate form in the melt and in the subsequently produced fertilizer solution, is most realistically one wherein as little as a few or perhaps about 5 percent of the phosphorus values are in the polyphosphate species, i.e., normally at this level 5 percent pyrophosphate and the remainder orthophosphate. It should, of course, be understood that there is no real upper limit ranging from the bottom limit of about 5 percent excepting that commercially available wet-process superphosphoric acids presently marketed are limited and do not contain more than about 50 percent of the total phosphorus values in the nonorthophosphate form. Therefore, the theoretical range of operation of my process will be the utilization of such a wet-process phosphoric acid containing from about 5 percent up to about 50 percent nonortho acylic polyphosphate species or higher if available and desirable; that the preferred range will be such an acid containing from about 10 to 30 percent nonortho species, and the most preferred range will be about 20 to 25 percent nonortho species. In addition, the temperature of reaction in the common line mixer should normally be at least about 630–640° F., but it may be allowed to go as high as perhaps 700° F. under some conditions. In addition, although I have described in the specification and shown in the drawing bleeding off a portion of the ammonia directly to the liquid solution vessel with only the remaining portion going to the common line mixer, under most conditions of operation of my process, it will perhaps be most desirable to introduce substantial amounts, if not all, of such ammonia into said common line mixer, together with said wet-process superphosphoric acid.

What I claim as new and desire to secure by Letters Patent of the United States is:

1. A process for preparing improved ammonium polyphosphate melts eminently suitable for ultimately preparing fertilizer base solutions, which melts are produced from wet-process superphosphoric acid, ammonia, and water, and which base solution has improved self-sequestering properties, which process comprises supplying a stream of ammonia to a common pipe reactor; supplying a stream of wet-process superphosphoric acid having from about 10 percent up to about 50 percent of its phosphorus value in the form of nonortho acyclic polyphosphate species to said common pipe reactor; and contacting said stream of ammonia with said stream of phosphoric acid in said reactor at about atmospheric pressure and at temperatures in the range in excess of about 630° F. to form a resulting melt of ammonium polyphosphate wherein at least 80 percent of the phosphorus values are converted to the nonortho acylic species.

2. The process of claim 1 wherein the temperature in said common pipe reactor is maintained in the range from about 630° F. upwards to about 700° F.

3. The process of claim 1 wherein the polyphosphate content of said wet-process superphosphoric acid is in the range from about 20 to about 25 percent by weight.

4. The process of claim 1 wherein the polyphosphate content of said wet-process superphosphoric acid is in the range from about 20 to about 25 percent by weight.

5. The process of claim 1 wherein said melt is subsequently introduced into a liquid fertilizer solution tank and therein intimately mixed with incoming streams of water and ammonia and wherein is formed a fertilizer solution of grade at least as much as 10–34–0.

6. The process of claim 1 wherein at least a portion of said superphosphoric acid is of the electric-furnace type.

7. The process of claim 6 wherein said superphosphoric acid is substantially electric-furnace acid.

8. The process of claim 1 wherein said resulting melt is introduced as a stream into a liquid fertilizer solution tank, together with a stream of water of formulation and additional ammonia if less than 100 percent of that required is fed to said common pipe reactor to produce therein an improved liquid ammonium polyphosphate base solution as product wherein the condensation of the polyphosphate formed is such that in said liquid fertilizer solution product containing 80 to 85 percent of its $P_2O_5$ value in polyphosphate form, the species distribution therein of ammonium pyrophosphate is less than about 32 percent by weight and the ammonium tripolyphosphate and ammonium polyphosphate more condensed than tripoly is greater than about 48 percent by weight.

9. The process of claim 8 wherein said pyrophosphate is in the range of about 25 to 32 percent by weight and said more condensed polyphosphates are in the range from about 48 to 60 percent by weight.

10. The process of claim 8 wherein said melt is subsequently solidified into a friable solid thereby rendering said melt eminently suitable for subsequent processing to a granular product by cooling said melt to about ambient temperature, said process characterized by the fact that said friable solid product is produced without requirement of mechanical working and/or aging thereof.

11. The process of claim 1 wherein the conversion in said melt to nonotho species is in the range from about 80 to about 96 percent.

References Cited

UNITED STATES PATENTS

| | | | |
|---|---|---|---|
| 3,397,036 | 8/1968 | Narins et al. | 23—106 |
| 3,503,706 | 3/1970 | Legal | 23—107 |
| 3,649,175 | 3/1972 | Legal | 23—107 |
| 3,464,808 | 9/1969 | Kearns | 71—34 |
| 3,420,624 | 1/1969 | Fitch | 23—107 |
| 3,044,851 | 7/1962 | Young | 23—107 |
| 2,568,901 | 9/1951 | Stengel | 423—396 |
| 2,902,342 | 9/1959 | Kerley | 423—310 |

OTHER REFERENCES

Chemical & Engineering News, vol. 47, Sept. 1, 1969, pp. 42 and 43.

OSCAR R. VERTIZ, Primary Examiner

G. A. HELLER, Assistant Examiner

U.S. Cl. X.R.

71—34, 43

PO-1050
(5/69)

UNITED STATES PATENT OFFICE
CERTIFICATE OF CORRECTION

Patent No. 3,775,534      Dated November 27, 1973

Inventor(s) ROBERT S. MELINE

It is certified that error appears in the above-identified patent and that said Letters Patent are hereby corrected as shown below:

Column 3, line 8, after "sulfuric" insert a period; line 17, change "solution" to -- solutions --
Column 5, line 8, change "polyphosphoric" to -- polyphosphate --
   line 25, change "evaporation" to -- evaporator --
Column 12, line 59, after "$P_2O_5$" insert -- . The lower $P_2O_5$ --
Column 15, claim 3, line 37, change "20 to about 25" to -- 10 to about 30
Column 16, claim 10, line 19, change "claim 8" to -- claim 1 --

Signed and sealed this 16th day of April 1974.

(SEAL)
Attest:

EDWARD M. FLETCHER, JR.
Attesting Officer

C. MARSHALL DANN
Commissioner of Patents